Sept. 27, 1966 L. SHAPIRO 3,275,935
H.V. POWER SUPPLY AND MEASURING SYSTEMS INCLUDING A SUPPLY
REGULATION SYSTEM HAVING TWO FEEDBACK PATHS AND
RESPONSIVE TO HIGH AND LOW FREQUENCY
OUTPUT VARIATIONS
Filed June 11, 1962 2 Sheets-Sheet 1

INVENTOR.
*Louis Shapiro*
BY
*Millman and Jacobs*
ATTORNEY.

Sept. 27, 1966 L. SHAPIRO 3,275,935
H.V. POWER SUPPLY AND MEASURING SYSTEMS INCLUDING A SUPPLY
REGULATION SYSTEM HAVING TWO FEEDBACK PATHS AND
RESPONSIVE TO HIGH AND LOW FREQUENCY
OUTPUT VARIATIONS
Filed June 11, 1962 2 Sheets-Sheet 2

INVENTOR.
Louis Shapiro
BY
Millward Jacobs
ATTORNEY.

United States Patent Office 3,275,935
Patented Sept. 27, 1966

3,275,935
H.V. POWER SUPPLY AND MEASURING SYSTEMS INCLUDING A SUPPLY REGULATION SYSTEM HAVING TWO FEEDBACK PATHS AND RESPONSIVE TO HIGH AND LOW FREQUENCY OUTPUT VARIATIONS
Louis Shapiro, Erlton, N.J., assignor, by mesne assignments, to The First Pennsylvania Banking and Trust Company, as trustee
Filed June 11, 1962, Ser. No. 201,697
18 Claims. (Cl. 324—123)

This invention relates to electronic systems and instruments utilizing high voltages, and particularly to a high voltage power supply and measuring system which is suitable for various electronic systems and instruments such as electron microscopes and beam devices.

Various electronic systems and instruments require extremely high operating voltages. Examples of such systems and instruments are electron microscopes, electron beam analyzers and welding devices, devices utilizing beams of charged particles such as protons, and instruments such as radiation detectors. The operating voltages of such systems may range from thousands to hundreds of thousands of volts. In addition, the supplied voltage is often required to be a variable one over a wide range. Moreover, it is often necessary that the voltage be highly regulated, for example, to within 0.001%. In an electron focusing or beam-forming system, for example, such high regulation is often necessary because any low frequency drift or high frequency transient tends to adversely affect the electron optics of the system, and any transients involving substantial power may cause injury to its electron gun. If a 50,000 volt supply is connected to a 110 volt A.C. source without any regulation, it is subject to the full extent of any line fluctautions in the 110 volt A.C. source. These fluctuations may amount to 10% of the nominal line voltage. When this 10% fluctuation is translated to the 50,000 volt level, the fluctuation becomes a matter of 5000 volts. At higher voltage supply levels, the absolute value of the fluctuation is of course greater. If standard voltage regulation transformers are utilized to regulate the line voltage, the fluctuation may be limited to 1%, which at 50,000 volts is 500 volts. This regulation problem increases when it is necessary to regulate the voltage at any setting between say 2000 and 50,000 volts rather than at one or two fixed voltage levels.

To deal with various applications of such electronic systems, it is desirable to adjust precisely and measure various operating parameters, particularly those of a critical nature. Thus, the high voltage level should be quickly and accurately set to any desired level over a substantial range. It is also desirable that the current through the load connected to the output of the high voltage power supply be accurately monitored and that the output voltage of the supply also be accurately monitored. In the case of electron microscopes, beam analyzers, and other related equipment a variable electron gun bias is often required, and it is desirable that the bias voltage be conveniently and accurately adjusted and monitored.

It is among the objects of this invention to provide a new and improved high voltage power supply and measuring system for electronic systems and instruments.

Another object is to provide a new and improved high voltage supply wherein the output high voltage level may be conveniently and accurately varied.

Another object is to provide a new and improved high voltage power supply wherein the output high voltage level is regulated against both high and low frequency fluctuations.

Another object is to provide a new and improved high voltage power supply wherein the load current may be accurately monitored.

Another object is to provide a new and improved high voltage power supply wherein the high voltage level may be accurately monitored.

Another object is to provide a new and improved high voltage power supply wherein auxiliary voltage levels in the load may be conveniently and accurately adjusted and monitored.

A feature of this invention is the provision in a high voltage power supply of an inverse feedback loop for regulating the high voltage against both high and low frequency fluctuations.

Another feature of this invention is the provision in a high voltage power supply of a circuit for measuring the load current and variable voltages in the load.

Another feature of this invention is the connection of a meter in a high voltage power supply together with a compensating circuit so that the meter accurately measures the load current.

Another feature of this invention is the utilization with an electron gun system of a circuit for measuring a variable gun bias voltage at a point remote from the electron gun.

Another feature of this invention is the utilization with an electron gun system of a slave device for conveniently obtaining impedance values representative of the settings of an adjustable gun bias resistor.

The foregoing and other objects of this invention, the features thereof, as well as the invention itself, may be more fully understood from the following description when read together with the accompanying drawings, in which.

Throughout the drawing, corresponding parts are referenced by similar numerals.

Figure 1:
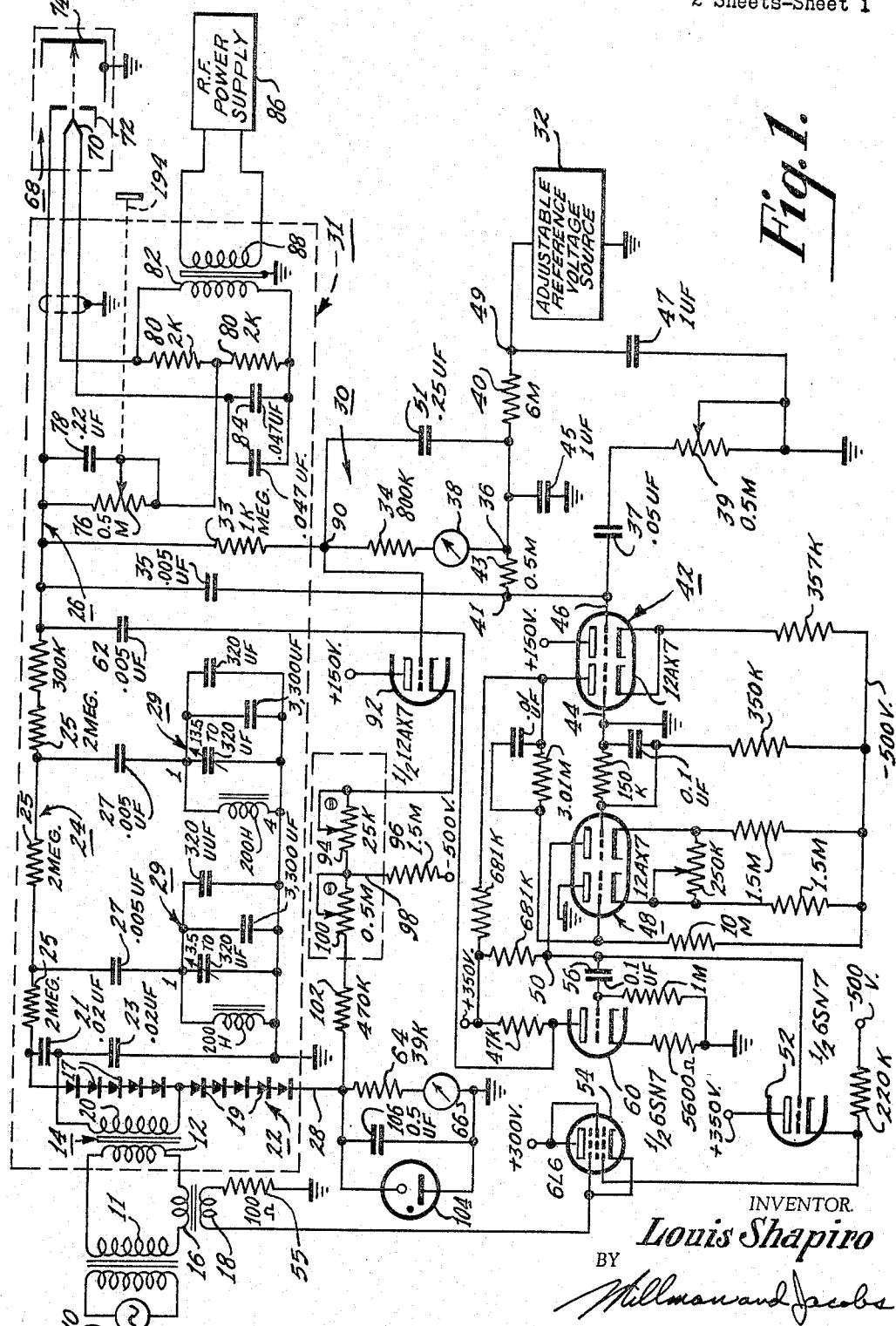
FIG. 1 is a schematic circuit diagram of an electronic system incorporating a high voltage power supply and measuring system embodying this invention.

In FIG. 1, a 60 cycle A.C. (alternating current) source 10 is coupled to a transformer 11 which isolates any D.C. (direct current) components in the source 10 from the remainder of the system. The secondary of transformer 11 transmits the A.C. power to the primary 12 of a step-up transformer 14 via a variable impedance device 16 which is connected in series. The device 16 is a saturable reactor winding which furnishes a variable series impedance to vary the A.C. current in response to a control current supplied to its control winding 18. Other variable impedance controls may be used in place of the saturable reactor 16, 18. The secondary 20 of the step-up transformer 14 is coupled via a rectifier and voltage doubling circuit 22 and a filter circuit 24 to an output line 26. The voltage on the line 26 is a high D.C. voltage with respect to a common return represented by the conventional ground symbol. The high voltage return for the rectifier 22 is via line 28.

The rectifier and doubler circuit 22 is formed by a series chain of ten rectifiers (connected as two groups 17, 19 of five each), which rectifier chain is connected at one end to a capacitor 21 and at the other to the high voltage return 28. Capacitor 21 is connected in series with a capacitor 23 which is returned to ground. One terminal of transformer secondary 20 is connected to the junction of the rectifier groups, and the other terminal is connected to the junction of the capacitors 23, 25. Except for the components in the high voltage return 28 (discussed below), the rectifier and doubler circuit 22 is a conventional configuration. The filter 24 is formed by three series resistors 25 connected between capacitor 21 and the high voltage line 26, and by two shunt capacitors 27 connected to the junctions of the resistors 25. An inductive-capacitive wave trap 29 connects each of the capacitors 27 to ground. The parameters of the filter networks are chosen in accordance with filter theory.

The transformer 14, rectifier 22, and related portions of the high voltage circuit are retained within an enclosure 31 (as shown in broken lines) in accordance with appropriate protective procedures for the handling of high voltage. Various enclosures may be used; in the illustrated embodiment, the enclosure 31 is an oil-filled container.

A network 30 for sampling the high voltage includes the series combination of resistors 33, 34, ammeter 38 and resistor 40 connected between line 26 and an adjustable source 32 of a positive reference voltage. Network 30 also includes the series combination of capacitors 35 and 37 and resistor 39 connected between line 26 and ground. The junction 36 of meter 38 and resistor 40 is consected to the junction 41 of the capacitors 35 and 37; this connection may be a direct one. However, preferably the capacitor junction 41 is connected to junction 36 through an isolating resistor 43, and junction 36 is returned to ground through a filtering capacitor 45. Another filtering capacitor 47 connects the junction 49 of resistor 40 and source 32 to ground. A capacitor 51 bypasses resistor 34 and meter 38.

The values of the resistance of 33, 34, and 40 and the positive voltage at source 32 are selected so that the direct voltage at the junction 36 is normally close to zero volts for a desired high voltage level. An error-signal or differential amplifier 42 is formed by two triodes with a common cathode resistor. The input terminal 44 at the grid of the first tube is connected to ground or zero voltage, and the input terminal 46 at the grid of the second tube is connected via resistor 43 to the junction 36 in the sampling network 28. Amplifier 42 has high gain and is D.C. stabilized. The output of the difference amplifier 42 is taken at the plate of the first tube without inversion and further amplified in amplifier 48 without inversion (amplifier 48 is a direct-coupled cathode-coupled triode pair). The output 50 of amplifier 48 is D.C. coupled via a cathode follower 52 to a triode-connected pentode driver tube 54, in the cathode circuit of which the control winding 18 and a small test-point resistor 55 are connected for current drive. The voltage effectively applied to transformer primary 12 varies directly as the control current in winding 18.

In operation, any low frequency departure of the high voltage on line 26 from the desired value, results in a small proportionate voltage change at juections 36 and 41 from zero. If the voltage on line 26 becomes too high in amplitude (i.e. too negative), the sampling voltage at junction 41 changes negatively from zero; and if too low, the sampling voltage changes positively. The sampling voltage is in inverted signal in its effect on the low frequency feedback loop. The sampling voltage change is detected by amplifier 42 and supplied as an amplified error signal from output terminal 50 to the driver circuit 54 for the saturable reactor control winding 18. The error signal thus fed to the saturable reactor 16, 18 is in inverse feedback relation. Thereby, the impedance of winding 16 is varied in a direction to change the effective line voltage applied to transformer 12 and restore the rectified high voltage to the desired value so that the sampling network voltage at junctions 36 and 41 is restored to zero volts.

The feedback connection from difference amplifier 42 via driver 54 and reactor 16, 18 ensures low frequency regulation of the high voltage. High frequency regulation is also provided by means of capacitor 35 which provides a high frequency bypass for high voltage fluctuations to terminal 41 and to the input 46 of difference amplifier 42. An amplified error signal is developed by amplifiers 46 and 48 and fed back in inverse relation via capacitor 56, inverting amplifier 60, and capacitor 62 to the high voltage line 26. In its effect on the high frequency feedback loop, the sampling voltage is not inverted, and the inversion takes place in amplifier 60. The cathode follower 60 energizes the coupling capacitor 62 to line 26 with a suitable low impedance to ensure high frequency correction of the high voltage. By appropriate choice of coupling capacitors 56 and 62 and the phasing networks, the frequency response of this feedback loop is controlled.

The low frequency feedback loop including driver 54 tends to correct for the gross high voltage fluctuations that are due to A.C. line variations. The frequency of these variations is generally of the order of 20 c.p.s. or less. This low frequency loop is also effective to automatically set the correct high voltage level with adjustments in the level of the reference voltage from source 32. The reference voltage is varied within the range of +30 to +300 volts for the circuit parameters illustrated in FIG. 1 to vary the high output voltage proportionately from −5 kv. to −50 kv. When the reference voltage is decreased from +300 volts, the voltage at junction 36 tends to fall below zero volts (as though there were an increase in the negative high voltage on line 26). Accordingly, the feedback loop is effective to increase the control drive on the saturable reactor which decreases the effective voltage applied to transformer primary 12 and, thereby, ultimately decreases the negative high voltage to the appropriate value corresponding to the new reference voltage. When the reference voltage is increased within its range, the opposite feedback action occurs. In either case, the feedback loop is referenced to zero volts at difference amplifier terminal 44, and the negative high voltage is also referenced to ground established at junction 36 by the feedback loop. The high frequency feedback loop via capacitor 56 and inverting amplifier 60 corrects the high frequency noise fluctuations of the high voltage level which may be, for example, 100 kc. to 20 c.p.s. These high frequency fluctuations will frequently be caused by small changes in the load impedance.

If the load is the electron gun of an electron microscope or the like, adverse effects on the electron optics caused by transients in the high voltage supply are generally prevented. Moreover, transients involving substantial power (such as those due to arcing in the load) are effectively reduced, and the system is restored to proper operation more quickly.

The capacitor 37 and resistor 39 control the phase of the total sampling network signal supplied to the difference amplifier 42 and are adjusted for stability of the feedback loop. Capacitor 45 filters any ripple that tends to develop at junction 36 and that may originate in the source 32; capacitor 47 assists in this filtering action. Resistor 43 isolates the bypass capacitor 35 from the filter capacitor 45.

The voltage level of output line 26 is continuously monitored in the sampling network 30 by the ammeter 38 which is calibrated as a voltmeter. One side of meter 38 is connected to junction 36 which is at zero volts during normal operation. Thus, the meter 38 which responds to the current through resistors 33 and 34 may be calibrated to indicate the voltage across those resistors 33 and 34, which voltage equals the high voltage level of line 26 with respect to ground. The movement of meter 38 in a conventional fashion is adequately damped so that it does not flutter due to any short time fluctuations in the voltage level of line 26.

A second meter 66 is used for accurately monitoring the load current. Meter 66 is connected between ground and a voltage-generating resistor 64, which, in turn, is connected to the high voltage return line 28 in the rectifier circuit. The load is shown as an electron beam analyzer 68 for which the embodiment of FIG. 1 is intended. The load may be an electron microscope or any other electron beam or charged particle beam device or electronic system. The power supply of FIG. 1 is not limited in its application to any particular type of load, and its parameters may be modified to meet any system requirements.

The beam device 68 includes a filament 70, a grid cap 72, and an anode structure 74 to which the electron beam emitted from the filament is directed. The anode 74 actually represents various structures in the device 68 which pick up beam electrons and which are returned to ground so that the entire beam current may be considered as returned to ground. The high voltage line 26 is directly connected to the grid cap 72 and via an adjustable self-biasing resistor 76 with bypass capacitor 78 to the junction of a pair of equal resistors 80. The resistors are connected across the secondary 82 of an isolating transformer used to energize the filament 70 with radio frequency signals via locking capacitor 84. The RF power supply 86 for heating the filament is connected to the transformer primary 88 and appropriately may include an oscillator operating at 80 kc. and 400 volts. This power supply 86 has no direct current component and does not affect the direct current supply of the rest of the system. The junction of the equal resistors 80 is at zero volts with respect to the RF signal so that this signal is effective only in the filament circuit. Thus, the direct voltage supply for the beam current is from line 26 and connected via the gun bias resistor 76 to the filament 72, and the beam current is returned to ground via anode 74. The load for the high voltage power supply is the electron beam itself, and only that power supply contributes to the beam.

As previously noted, the sampling network 30 is also connected between the high voltage line and the source 32 of reference voltage, which is also returned to ground. The junction 90 of resistors 33 and 34 is connected to the grid of a cathode follower 92, the cathode impedance of which includes two series resistors 94 and 96. The junction 98 of the latter resistors 94, 96 is connected via series resistors 100 and 102 to the high voltage return 28.

The voltage at junction 90 is negative with respect to zero-voltage junction 36, and the voltage at terminal 98 on the cathode impedance is likewise negative and adjusted to be equal to the voltage at junction 90 by means of resistor 94. An electron current flows from terminal 98 to the high voltage return 28 and through resistor 64 and meter 66 to ground. The significance of this current from terminal 98 as a compensating current in meter 66 may be appreciated by recalling the other electron current paths from the high voltage transformer 20 to ground. One such electron current path, the load path, includes the high voltage circuit of the transformer secondary 20, the rectifier 22 and the filter 24, the high voltage line 26, the load (the beam current device 68) to ground, and back through the meter 66 to the high voltage return 28. The other such electron current path via the sampling network also includes the high voltage circuit 20, 22 and 24, the line 26, the resistors 33, 34, ammeter 38, resistor 40, and the positive reference voltage source 32 to ground, and back via the meter 66 to the high voltage return 28. The current in both of these electron current paths is in the opposite direction from the compensating current supplied from terminal 98 via resistors 100 and 102. By appropriate choice of resistance values in the compensating network (i.e. the values of resistors 100, 102, 64 and meter 66) to equal that of resistor 34, both the voltage and resistance are made to be equal so that the compensating network current is equal to the sampling network current. Since the compensating current is also opposite, it balances the sampling network current in meter 66, and the net current in the meter is the load current.

Due to the linear relationships that exist, any change in the reference voltage level supplied by source 32 causes a directly proportional change in the high voltage level on line 26 and correspondingly at junction 90 as well as at junction 98 of the cathode follower. The voltages at junctions 90 and 98 are referenced to the common ground potential maintained at junction 36 by the action of the negative feedback loops. The meter 66 is also connected to ground. The resistors 94 and 100 are adjusted for one setting of the positive reference voltage source 32 to supply a current through resistors 100 and 102 which is equal to that through sampling network resistor 34. Thereby, the same proportionalities of voltage and resistance exist in the sampling and compensating networks so that equal currents are developed there for all other settings of the source 32. Resistors 94 and 100 are adjustable to facilitate setting the resistance and voltage values that determine the compensating current; for example, this may be done with zero load current, at which the meter reading should be zero for the range of reference voltage values and corresponding high voltage levels.

A gas tube diode 104 is connected between ground and the high voltage return 28 so that it is connected across the voltage-generating resistor 64 and meter 66. A capacitor 106 is connected across the gas tube 104. The voltage-generating resistor 64 develops the firing voltage for the gas tube 104 when excessive currents are drawn in a load. This may be due, for example, to arcing in the electron beam system. When this occurs, the gas tube bypasses the excessive current around the meter to protect it from injury.

The capacitor 106 bypasses the A.C. component of surges in the high voltage return and thereby protects the meter. This capacitor stabilizes the meter circuit within its time constant (which is about 0.02 second for the illustrated parameters) and is effective to smooth out the pulse nature of the current in rectifiers 17 and 19. The meter 66 also has a damping effect on the pulsating current so that it provides a steady mean current reading. It may be noted that the filter circuit 24 is also returned to ground. However due to the capacitors 23 and 27, there is no D.C. component to ground in the filter 24, but rather only an A.C. component which bypasses the meter 66 and which does not affect the meter reading of true load current.

Figure 2:
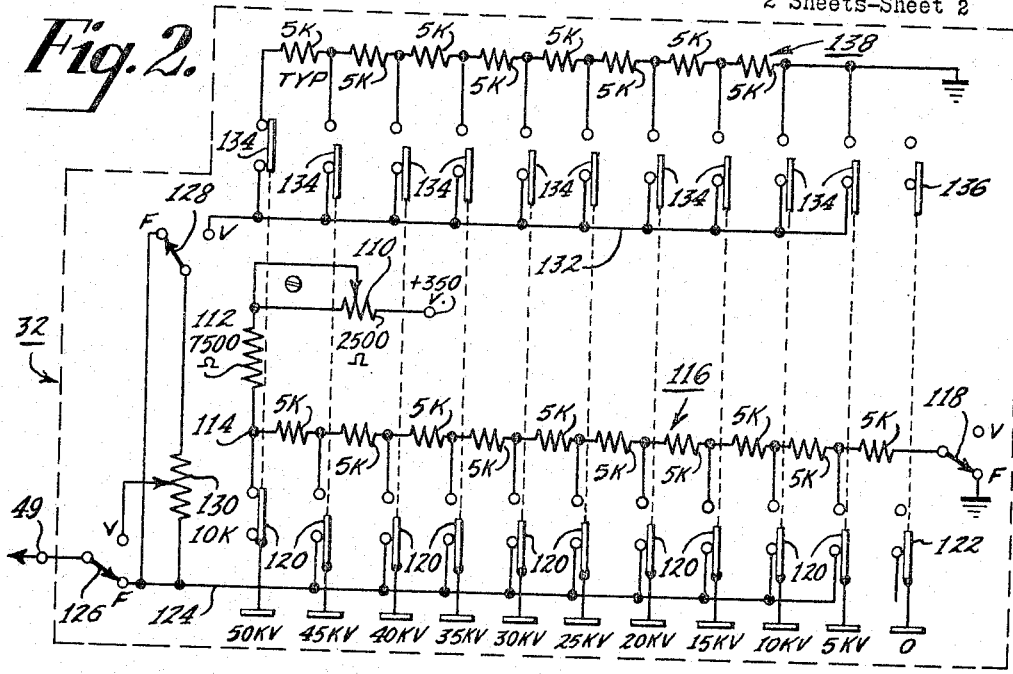
FIG. 2 is a schematic circuit diagram of an adjustable reference voltage source for use in the system of FIG. 1.

A circuit for the reference voltage source 32 is shown in FIG. 2 and includes a +350 volt regulated power supply connected via an adjustable resistor 110 and resistor 112 to one end 114 of a ten-resistor voltage divider network 116. The voltage divider 116 is formed by ten equal value resistors connected in series. The other end of the divider 116 is connected by a switch 118 either to a floating contact or to a grounded contact (which latter position is illustrated in FIG. 2). The resistance of resistor 110 may be varied so that +300 volts is provided at terminal 114 and across the entire divider with 30 volt decrements developed at successive junctions of the resistors. Ten selector switches 120 respectively connect terminal 114 and the other resistor junctions to a bus 124. An eleventh such switch is left disconnected from divider 116 and bus 124 and instead is used when actuated to open a switch (not shown) for the main power source 10. The selector switches 120, 122 are operable by actuators in a latching keyboard which is interlocked to permit only one actuator to be operated at a time. Thus, selective operation of the keyboard provides from +30 to +300 volts in 30 volt increments to the bus 124. The bus 124 is connected via one contact of a switch 126 to the reference voltage terminal 49 of the resistor 40. These 30 volt reference increments may correspond respectively to high voltage output levels of −5 to −50 kv. at line 26 for the circuit parameters illustrated in FIG. 1. Each of the actuators of switches 120 is identified by the associated high voltage.

If it is desired to supply a reference voltage level intermediate any of the 30 volt increments, switches 118, 126 and 128, which are ganged together, are moved from the illustrated F-contact positions to the V-contact positions. Thereby, switch 118 disconnects the low end of the voltage divider from ground and switch 128 connects one end of a variable resistor 130 (which is equal in total resistance value to two resistors of divider 116) to a bus 132. The other end of resistor 130 is connected to bus 124. Switch 126 now connects the tap of resistor 130 to the output terminal 49. Bus 132 is connected to a contact of each of eleven switches 134 and 136 which are respectively mechanically ganged to switches 120 and 122. Eight resistors, each equal in resistance value to the resistors of divider 116, are connected in series to provide an auxiliary voltage divider 138, one end of which is connected to ground and the other to a contact of the 50 kv. switch 134. The junctions of these resistors are respectively connected to contacts of the 45 kv. to 15 kv. switches 134. The corresponding contacts of the 10 and 5 kv. switches 134 are connected to ground. Selective operation of one of the 5 kv. to 50 kv. switch actuators (with the switches 118, 126 and 128 in the V-position) completes a series circuit from the +350 v. source and resistors 110 and 112 through a portion of the divider 116, the actuated switch 120, resistor 130, the actuated ganged switch 134, and a portion of divider 138 to ground. The total number of resistors of dividers 116 and 138 connected in this series circuit for any of these switches being actuated is a total of eight (in view of the omission of two resistors at the grounded end of divider 138); together with the resistor 130, this series circuit contains the same resistance as that in the full divider 116. Thus, the tap on resistor 130 permits a continuous adjustment of the reference voltage to select any desired high voltage level within the 10 kv. range below that corresponding to the selected switch actuator. Thus, selection of the 50 kv. switch, permits adjustment of the high voltage to any value from 50 to 40 kv. Accordingly any intermediate high voltage within the range indicated can be established with the switches 118, 126 and 128 in the V-position. The switch 128 in the F-position connects the bus 124 across variable resistor 130 to ensure that it is not left floating when the source 32 is being operated to select fixed high voltage levels.

Additional switch banks (not shown) like switches 120, 122, 134, 136, may be provided for the control of other interrelated parameters of the beam device 68 with adjustment of the high voltage level by the selector switches. These additional switch banks may be used to establish, for example, appropriate values of electron lens currents or stigmator voltages with the selection of the different high voltage levels.

In the operation of an electronic system having an electronic gun as shown in FIG. 1, particularly one having operating parameters of a critical nature which must be precisely adjusted, it is often desirable to know the variable gun bias voltage between the emitting gun filament 70 and the grid cap 72. This bias together with the high voltage level and the beam current gives important operating conditions of the system; for example, the focussing properties of the system or the trajectory of the beam. This gun bias may normally range from zero to −500 volts for the illustrated system. The filament and grid cap may be operated at high negative voltages with the anode grounded, as shown in FIG. 1; or the anode may be operated at a high positive voltage and the filament or grid cap grounded. Such systems, for example, are electron beam analyzers operating at 50,000 volts, electron microscopes at about 100,000 volts, and electron beam welding equipment at 150,000 volts and higher. It is difficult to reach components operating at such high voltages with normal voltage monitoring devices without great inconvenience and the exercise of extreme precaution. Moreover, even where the grid or filament is grounded, they are often in a vacuum or otherwise inaccessible.

Figure 3:
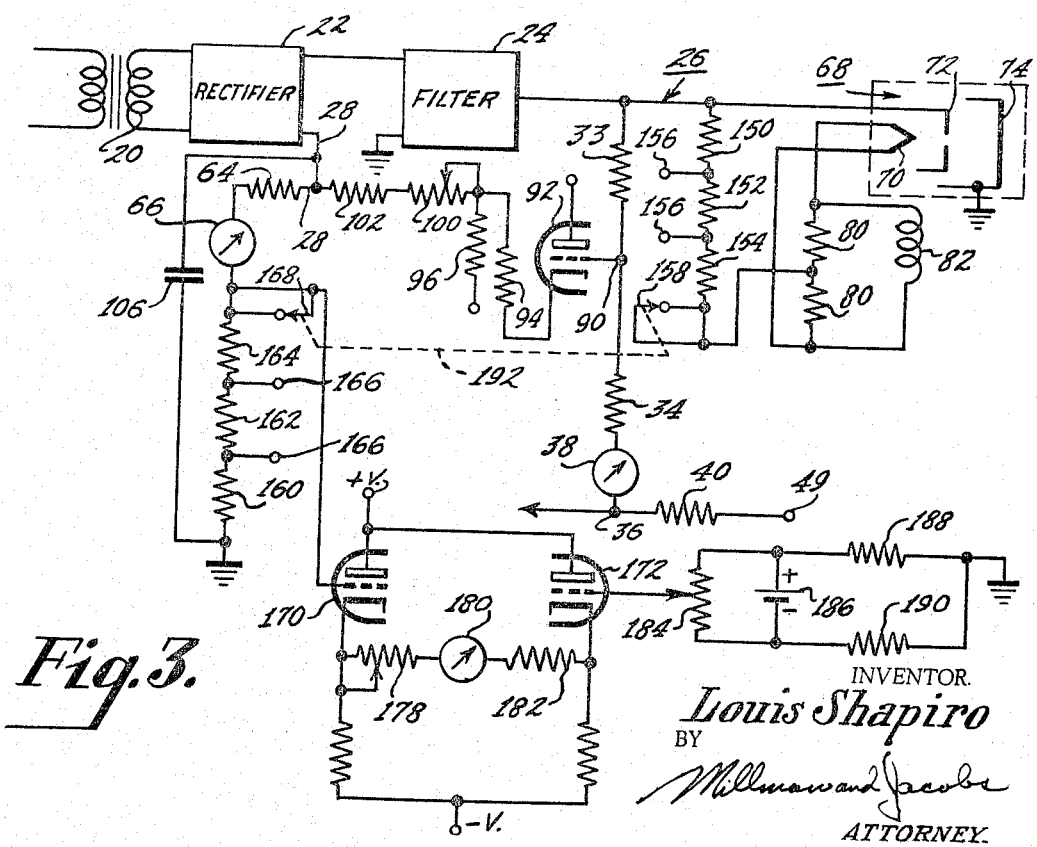
FIG. 3 is a schematic circuit diagram of a modification of the system of FIG. 1.

FIG. 3 shows a modification of the power supply system of FIG. 1 which incorporates certain additional means for conveniently and accurately measuring the gun bias of the electron beam system. In FIG. 3, parts corresponding to those previously described are referenced by the same numerals; these parts function in the manner previously described except as noted below. Certain parts, such as for example the amplifiers 42 and 48, are omitted in FIG. 3 for simplicity of illustration; however, all of the system of FIG. 1 is employed with that of FIG. 3 except where otherwise indicated.

In FIG. 3, the gun bias resistor is formed by a series of precision resistors 150, 152, 154 connected in series between the high voltage line 26 and the junction of the resistors 80 connected across the gun filament 70. Selector switch contacts 156 are connected to the junctions of those resistors and to the filament end of resistor 154. The selector switch brush 158 is connected to the filament end of resistor 154. A similar series of slave resistors 160, 162, and 164 is connected in series between ground and meter 66. Selector switch contacts 166 are connected to the junctions of the slave resistors and to the meter terminal of resistor 164. The selector switch brush 168 is connected to the meter terminal of resistor 164. The slave resistors 160, 162, and 164 are smaller than and respectively proportional to the bias resistors 150, 152, and 154. As many incremental steps of resistance may be provided as desired for the bias and slave resistors, and the steps may be of equal or unequal values. These resistors are preferably of the precision type to provide high accuracy of resistor measurement. The selector switch brushes 158 and 168 are mechanically ganged together in a suitable fashion so that corresponding ones of the bias and slave resistors are connected in circuit with changes in selector switch position.

The selector switch brush 168 is connected to the grid of tube 170 which is connected as a cathode follower. A second cathode follower 172 is used as a reference. The tubes 170 and 172 have their cathodes connected together in a meter network that includes the series combination of resistor 178, meter 180, and resistor 182. The grid of tube 172 is connected to a potentiometer 184 having a voltage source 186 connected across it, and separate equal value resistors 188 and 190 connecting the terminals thereof to ground. The metering circuit of tube 170, 172 is a balanced circuit with the potentiometer 184 providing a zeroing control. The connection of the potentiometer with both terminals connected to ground provides a positive or negative voltage with respect to ground at the potentiometer tap for the zeroing adjustment. Thereby, the meter 180 is adjusted to a zero reading when the voltage on the brush 168 is zero. The variable resistor 178 provides a sensitivity control to vary the amount of meter deflection for different ranges of voltage at the selector switch brush 168 so that a reading that is convenient for a desired accuracy is obtained from the meter 180. When so adjusted, the deflection of meter 180 is proportional to the voltage at selector switch brush 168.

Due to the compensating network, as explained above, the current in the slave resistors is accurately representative of the emission current. The variable resistor 100 is adjusted so that the resistance in the series circuit of meter 66 including the slave resistors is accurately representative of the resistance of resistor 34 and meter 38 in the sampling network. Thereby, the compensating current is made to be exactly equal and opposite to the sampling network current in a manner similar to that described above. This sampling network current, for the values indicated in the circuit of FIG. 1, may be the order of 50 microamperes, and the compensation of this current in the slave resistors insures a high accuracy in the gun bias voltage measurement.

Accordingly, the current in the slave resistors 160 to 164 is accurately equal to the emission current from the filament 70 (since systems of this sort are of high quality and contain very little leakage paths which might otherwise make spurious contributions to the current in the slave resistors). Consequently, both the current and the resistance values in the slave meter circuit are accurately proportional to the current and resistance in the gun bias circuit, and the ratio of the metered voltage at slave brush 168 to the gun bias voltage is directly proportional to the ratio of the gun bias resistors to the slave resistors.

The calibration of meter 180 preferably is directly in terms of the gun bias voltage across the resistors 150, 152, 154. That is, when the selector switch brush 158 is in the position shown in FIG 3, the full emission current supplied by the high voltage line 26 flows through those resistors to produce a bias of 500 volts (for this purpose, the combined resistance of the bias resistors totals 0.5 megohm, and the emission current is about 1 milliampere). The resistors 160, 162, 164 total 10,000 ohms for the corresponding position of brush 168, so that the total voltage across those resistors is 10 volts. Thus, for the range of 0 to 10 volts at the brush 168, the meter 180 is calibrated to read 0 to 500 volts. By adjustment of resistor 178, the meter calibration 180 may be changed to a low voltage scale to read 0 to 100 volts corresponding to the voltage at brush 168 ranging from 0 to 2 volts.

The ganging of the switch brush 168 to the brush 158 for the gun bias resistors is by means of a dielectric rod represented by the broken line 192 connecting those brushes. This rod 192 is positioned in the oil-filled enclosure 31 (FIG. 1) and mechanically connected by suitable rod couplings to the selector switch brush 158. The rod 192 extends upwardly out of that enclosure and is coupled to the brush 168 and retained in operating position by appropriate brackets. Thereby, the mechanical coupling of the slave brush 168 to the high voltage brush 158 in the oil-filled enclosure is a simple mechanical one which permits manual operation to rotate the dielectric rod 192 and adjust the slave brush 168 in proper relation with the high voltage brush 158. Consequently, the slave resistors and metering circuit therefor are operated at low voltage levels and electrically decoupled from the high voltage levels and from the inaccessible gun bias resistors.

The incremental resistances provided by the selector switches 158 and 168 insure a very high accuracy in the relation of the slave resistance values to the gun bias resistance values. Where lesser precision is appropriate, the gun bias resistor and slave resistor may be in the form of continuously adjustable potentiometers (such as the resistor 76 of FIG. 1). The potentiometers are ganged by a dielectric rod 192 in the manner described above so that a constant ratio of resistance is maintained between the slave and gun bias potentiometers with adjustment of the angle of rotation of the dielectric rod. The operation of this arrangement is similar to that described above except that a continuous adjustment of gun bias voltage is made, and the meter 180 provides a corresponding continuous reading of the slave voltage and the proportional gun bias voltage.

Calibration of the system does not require the application of high voltage to the circuitry concerned. Opposite terminals of a low test voltage source may be connected to the brushes 158 and 168, and the high voltage line 26 returned to ground. Thereby, the gun bias resistors and slave resistors are placed in series circuit, so that a standing vacuum tube volt meter may be used to read the voltage existing across the gun bias resistors while the meter 180 is zeroed and adjusted to establish correspondingly appropriate readings of the voltage across the slave resistors. These readings should correspond for all values of voltage existing across the gun bias resistor from zero up to the maximum test voltage.

In overall operation, the desired high voltage is elected by means of one of the switch actuators 120 (FIG. 2), which high voltage may be one of a number of fixed voltage levels or an adjustable variable level, as explained above. The low frequency feedback loop via cathode follower 52 and saturable reactor 16 (FIG. 1) automatically establishes the appropriate high voltage on the line 26. This voltage, which is referenced to ground, is applied directly to the grid cap 72 of the beam device 68 and via the biasing resistor 76 to the filament 70 to establish the emission current. The biasing resistor 76 may be adjusted by a dielectric rod 194 (FIG. 1) extending from the oil-filled enclosure 31. Low frequency fluctuations on a high voltage line 26 are regulated by the low frequency feedback loop via cathode follower 52, and high frequency fluctuations are regulated via the feedback loop that includes the inverting amplifier 60 and capacitor 62. The voltage on line 26 is monitored by meter 38 which is referenced to the ground potential maintained at terminal 36. The meter 66 monitors the load current, all of which is returned via the common ground connection through the meter 66 to the high voltage return 28. The current in the sampling network 30, which is also returned via meter 66, is compensated by an opposing current supplied to that meter 66 via the compensating network 98, 100, 102 so that the net current in meter 66 is the load current itself.

The gun bias voltage is monitored (FIG. 3) by means of a slave resistor 160, 162, 164 which is adjusted to be proportional to the bias resistor 150, 152, 154 by means of a mechanical coupling 192. Thereby, the slave resistor is operated at a relatively low voltage remote from the enclosed, inaccessible gun bias resistor. The current in the slave resistors 160, 162, 164 is equal to the emission current in the gun bias resistors so that a proportionate voltage is established in the slave circuit which is monitored by the meter 180 calibrated to the gun bias voltage values.

Thus, this system provides a high voltage supply and a current and voltage-measuring arrangement for measuring the high voltage as well as the load current and voltages at inaccessible or high voltage points in the load circuit. The power supply is regulated for high frequency and low frequency fluctuations and is applicable to various electronic systems employing high voltages. The high voltage supply may be used to provide a high positive voltage as well as the negative voltage illustrated in FIG. 1. The positive voltage may be provided by a reversal of appropriate parts such as the rectifiers and corresponding other parts. With such a reversal, the metering circuit for the load current may be compensated in a manner similar to that described above. Various other modifications of the above-described invention to meet particular applications will be apparent from the foregoing description.

What is claimed is:

1. A high voltage electronic system comprising an electronic device operating at a high voltage, a high voltage power supply for supplying direct current and having a high voltage terminal connected to a terminal of said device and having a direct current return terminal, a meter connected at one of its terminals to said direct current return terminal, means for sampling the voltage at said high voltage terminal and having a terminal connected thereto, means for applying a reference voltage to said voltage sampling means, a common return circuit connected to another terminal of said device, to another terminal of said sampling means, and to another terminal of said meter so that currents in said device and said sampling means flow through said meter, and means for applying a current to said meter equal and opposite to said sampling means current so that the net meter current varies in accordance with said device current.

2. A high voltage electronic system comprising an electronic device having a variable impedance with a terminal for receiving current in said device and for developing a control voltage proportional to a direct current supplied thereto at a high voltage, a power supply having an output terminal connected to said device for supplying direct current at a high voltage thereto and having a direct current return terminal, a variable slave impedance connected at one terminal to said return terminal, means for mechanically coupling said slave impedance to said device impedance to vary said impedances together and proportionately, a common return circuit connected to another terminal of said device and to another terminal of said slave impedance so that direct current in said device flows through said slave impedance and said direct current return terminal is at a voltage level different from that of said common return circuit, and means for measuring the voltage across said slave impedance, so that low voltages measured across said slave impedance with respect to said common return circuit are accurately representative of the control voltages developed across said variable device impedance at high voltages.

3. A high voltage electronic system comprising a high voltage power supply including a high voltage output terminal for connection to and for delivering direct current to a load, a load including a variable impedance connected to said output terminal, and a direct current return terminal; means for varying the power applied to said power supply; a sampling network connected to said output terminal, means for applying various reference voltages to said sampling network, a negative feedback circuit connected to said sampling network for controlling said power varying means in response to low frequency changes in voltage in said sampling network and for varying the voltage at said output terminal in response to high frequency changes in voltage therein, a meter and a variable slave impedance connected in a series combination and to said return terminal, means for mechanically coupling said slave impedance to said load impedance to vary said impedances together and proportionately, a common return circuit connected to said load, to said sampling network and to said series combination so that load current and sampling network current flows in said slave impedance and meter, means responsive to a voltage in said sampling network for applying a current to said series combination equal and opposite to said sampling network current, and means for measuring the voltage across said slave impedance.

4. A high voltage electric system as recited in claim 3 wherein said means for applying reference voltages includes a first voltage divider network having a plurality of intermediate terminals, first switch means for selectively connecting one of said terminals to a first line, a second voltage divider network having a plurality of intermediate terminals, second switch means for selectively connecting one of said second divider terminals to a second line, a variable impedance, means for alternatively applying a voltage across said first divider or across a circuit including portions of said first and second dividers, said first and second switch means, said first and second lines, and said variable impedance, and means for deriving a reference voltage in accordance with the voltage at said first line.

5. A high voltage electronic system comprising a high voltage power supply including a high voltage terminal, means for varying the power applied to said power supply, and regulating means including a negative feedback circuit connected to said high voltage terminal, said feedback circuit including means providing a reference voltage, amplifying means responsive to the voltage at said terminal and said reference voltage for producing error voltages at its output, and a first feedback path, connected from the output of said amplifying means to said power varying means for controlling said power varying means in response to low frequency changes in voltage at said terminal, said feedback circuit further including a second feedback path connected from the output of said amplifying means to said terminal for varying the voltage at said terminal in response to high frequency changes in voltage thereat.

6. A high voltage electronic system comprising a high voltage power supply including a high voltage terminal, means for varying the power applied to said power supply, and regulating means including a negative feedback circuit connected to said high voltage terminal for controlling said power varying means in response to low frequency changes in voltage at said terminal and for varying the voltage at said terminal in response to high frequency changes in voltage thereat, said means for varying power including a variable impedance device, and said feedback circuit including a first branch coupled to said variable impedance device to control the impedance thereof, and a second branch capacitively coupled to said high voltage terminal for varying the voltage thereat.

7. A high voltage electronic system as recited in claim 6 wherein said negative feedback circuit includes a voltage divider sampling network, connected at one terminal to said high voltage terminal, means for supplying different constant voltages to another terminal of said sampling network to vary the high voltage level, a difference amplifier having one input terminal connected to an intermediate terminal of said sampling network, having a second input terminal for receiving a reference voltage, and having an output terminal coupled to said feedback circuit branches.

8. A high voltage electronic system as recited in claim 7 wherein said power varying means includes an alternating current source, said power supply includes a rectifier circuit for converting the alternating current to a direct voltage of one polarity, and said means for supplying constant voltages is effective to supply voltages of the opposite polarity, whereby the voltage at said intermediate terminal tends to be zero voltage.

9. A high voltage electronic system as recited in claim 8 wherein said sampling network includes a meter connected between said intermediate terminal and said high voltage terminal for indicating the voltage at said high voltage terminal.

10. A high voltage electronic system as recited in claim 6 wherein said power supply includes a direct current return terminal, and said system further comprises a load connected to said high voltage terminal, a metering circuit connected to said return terminal, and a compensating network connected between said sampling network and said metering circuit, said load, said metering circuit, and said sampling network being connected by a common return circuit so that load current and sampling network current flow in said metering circuit, said compensating network having means responsive to the voltage at an intermediate terminal of said sampling network for supplying to said metering circuit a current opposite to said sampling network current and varying in amplitude in accordance with the sampling network current.

11. A high voltage electronic system as recited in claim 10 wherein said load includes a variable impedance element for receiving said load current, and said metering circuit includes a variable impedance element mechanically coupled as a slave to said load impedance element, and a meter for indicating the voltage across said slave impedance element.

12. A high voltage electronic system as recited in claim 11 wherein said load includes an electron beam system having an electron gun and an anode electrode connected to said common return circuit, said load variable impedance element includes a variable gun bias resistor, and said slave impedance element includes a smaller variable resistor and a dielectric rod coupling said slave resistor to said gun bias resistor.

13. A high voltage electronic system as recited in claim 12 wherein said power supply and gun bias resistor are mounted in an oil-filled enclosure, and said metering circuit is outside of said enclosure.

14. A high voltage electronic system comprising a high voltage power supply including a high voltage output terminal for connection to and for supplying direct current to a load, and a direct current return terminal; a voltage sampling network connected to said output terminal; a negative feedback circuit including an adjustable reference voltage source connected to said sampling network for regulating said power supply in response to changes in voltage in said sampling network corresponding to voltage variations at said output terminal; a metering circuit connected to said return terminal, a common return circuit connected to said sampling network and to said metering circuit and adapted for connection to said load so that load current and sampling network current flow in said metering circuit, and means for applying a current to said metering circuit opposite to said sampling network current and varying in accordance therewith.

15. A high voltage electronic system as recited in claim 14 wherein said metering circuit includes a variable impedance element adapted to be mechanically coupled to said load, and a meter for indicating the voltage across said variable impedance element.

16. A high voltage electronic system as recited in claim 14 wherein said means for applying a current to said metering circuit includes a compensating circuit connected to an intermediate terminal of said sampling network and responsive to the voltage thereat for supplying said opposite current.

17. A high voltage electronic system comprising a high voltage power supply including a high voltage terminal, means including a sampling network connected to said high voltage terminal and a negative feedback circuit responsive to voltage variations at a terminal of said sampling network for regulating said power supply and the voltage at said high voltage terminal, and means for adjusting the voltage at said high voltage terminal including a system for selectively supplying different reference voltages to said sampling network, said reference voltage supplying system comprising a first voltage divider network having a plurality of intermediate terminals, first switch means for selectively connecting one of said terminals to a first line, a second voltage divider network having a plurality of intermediate terminals, second switch means for selectively connecting one of said second divider terminals to a second line, a variable impedance, means for alternatively applying a voltage across said first divider or across a circuit including portions of said first and second dividers, said first and second switch means, said first and second lines, and said variable impedance, and means for deriving said reference voltages in accordance with the voltage at said first line.

18. A high voltage electronic system as recited in claim 17 wherein said sampling network includes a meter connected between said high voltage terminal and said sampling network terminal.

References Cited by the Examiner

UNITED STATES PATENTS 3,056,078  9/1962  Goodier et al. _____ 323—66

OTHER REFERENCES

Craggs and Meek: High Voltage Laboratory Technique, Butterworth Scientific Publications (London, 1954), pp. 237, 293–296, 381–382.

WALTER L. CARLSON, *Primary Examiner.*

FREDERICK M. STRADER, *Examiner.*

D. R. GREENE, J. MULROONEY, *Assistant Examiners.*